United States Patent
Fang et al.

(10) Patent No.: US 11,088,407 B2
(45) Date of Patent: Aug. 10, 2021

(54) SYSTEM AND METHOD OF MANAGING BATTERY CELLS

(71) Applicant: Dell Products L.P., Round Rock, TX (US)

(72) Inventors: Jui-Chin Fang, Taipei (TW); Shao Szu Ho, New Taipei (TW); Chia Fa Chang, Taipei (TW); Chien Hao Chiu, Taoyuan (TW); Chia Liang Lin, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 16/421,718

(22) Filed: May 24, 2019

(65) Prior Publication Data

US 2020/0373632 A1 Nov. 26, 2020

(51) Int. Cl.
*H02J 7/00* (2006.01)
*H01M 10/613* (2014.01)
*H01M 10/42* (2006.01)

(52) U.S. Cl.
CPC ....... *H01M 10/613* (2015.04); *H01M 10/425* (2013.01); *H02J 7/0091* (2013.01); *H01M 2010/4271* (2013.01)

(58) Field of Classification Search
USPC ........................................................ 320/150
See application file for complete search history.

(56) References Cited

U.S. PATENT DOCUMENTS

| 7,508,171 | B2 | 3/2009 | Carrier et al. | |
| 9,379,410 | B2 | 6/2016 | Thompson et al. | |
| 2010/0295513 | A1* | 11/2010 | McCollum | G06F 1/30 320/134 |
| 2014/0095091 | A1* | 4/2014 | Moore | G01R 31/3648 702/63 |

* cited by examiner

Primary Examiner — Bryce M Aisaka
(74) Attorney, Agent, or Firm — Baker Botts L.L.P.

(57) ABSTRACT

In one or more embodiments, one or more systems, methods, and/or processes may determine that a timeout value has been reached; for each battery cell of multiple of battery cells: may determine if a temperature value associated with the battery cell meets or exceeds a threshold temperature value; if the temperature value associated with the battery cell does not meet or exceed the threshold temperature value, may permit the battery cell to be charged and discharged; if the temperature value associated with the battery cell meets or exceeds the threshold temperature value: may increment a temporary fail count associated with the battery cell; and may prevent at least one of charging and discharging the battery cell; may determine if temporary fail count exceeds a temporary fail count threshold; and if the temporary fail count does not exceed the temporary fail count threshold, may permit charging and discharging the battery cell.

20 Claims, 10 Drawing Sheets

SYSTEM AND METHOD OF MANAGING BATTERY CELLS

BACKGROUND

Field of the Disclosure

This disclosure relates generally to information handling systems and more particularly to managing battery cells of a battery system configured to be utilized by an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine that a first timeout value has been reached; in response to determining that the first timeout value has been reached, for each battery cell of multiple of battery cells: may determine a temperature value associated with the battery cell; may determine if the temperature value associated with the battery cell meets or exceeds a threshold temperature value; if the temperature value associated with the battery cell does not meet or exceed the threshold temperature value, may permit the battery cell to be charged and discharged; if the temperature value associated with the battery cell meets or exceeds the threshold temperature value: may increment a first temporary fail count associated with the battery cell; and may prevent at least one of charging and discharging the battery cell; may determine if first temporary fail count is above a first temporary fail count threshold; if the first temporary fail count is not above the first temporary fail count threshold, may permit charging and discharging the battery cell; and if the first temporary fail count is above the first temporary fail count threshold, may log a permanent failure of the battery cell.

In one or more embodiments, the one or more systems, methods, and/or processes may further determine that a second timeout value has been reached; in response to the determining that the second timeout value has been reached, for each battery cell of multiple battery cells: may further determine a voltage value associated with the battery cell when the cell when the battery cell is not discharging; may further determine if the voltage value is less than or equal to a threshold voltage value; if the voltage value is not less than or equal to the threshold voltage value, may further permit the battery cell to be charged and discharged; if the voltage value is less than or equal to the threshold voltage value: may further increment a second temporary fail count associated with the battery cell; and may further prevent the at least one of charging and discharging the battery cell; may further determine if the second temporary fail count is above a second temporary fail count threshold; if the second temporary fail count is not above the second temporary fail count threshold, may further permit charging and discharging the battery cell; and if the second temporary fail count is above the second temporary fail count threshold, may further log the permanent failure of the battery cell.

In one or more embodiments, the second timeout value may be the first timeout value. In one or more embodiments, the second temporary fail count may be the first temporary fail count. In one or more embodiments, the second temporary fail count threshold may be the first temporary fail count threshold. In one or more embodiments, at least two of the multiple battery cells may be arranged in a parallel fashion. In one or more embodiments, a switch may be coupled to the battery cell. For example, a battery system may include the switch. For instance, to prevent the at least one of charging and discharging the battery cell, the one or more embodiments, one or more systems, methods, and/or processes may further control the switch to prevent the at least one of charging and discharging the battery cell.

In one or more embodiments, the one or more systems, methods, and/or processes may further determine that a third timeout value has been reached; in response to determining that the third timeout value has been reached, for each battery cell of multiple battery cells: may further determine an internal resistance value associated with the battery cell; may further determine if the is internal resistance value less than or equal to a threshold internal resistance value; if the internal resistance value is not less than or equal to the threshold internal resistance value, may further permit the battery cell to be charged and discharged; if the is less than or equal to the threshold voltage value: may further increment a third temporary fail count associated with the battery cell; and may further prevent the at least one of charging and discharging the battery cell; may further determine if the third temporary fail count is above a third temporary fail count threshold; if the third temporary fail count is not above the third temporary fail count threshold, may further permit charging and discharging the battery cell; and if the third temporary fail count is above the third temporary fail count threshold, may further log the permanent failure of the battery cell.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
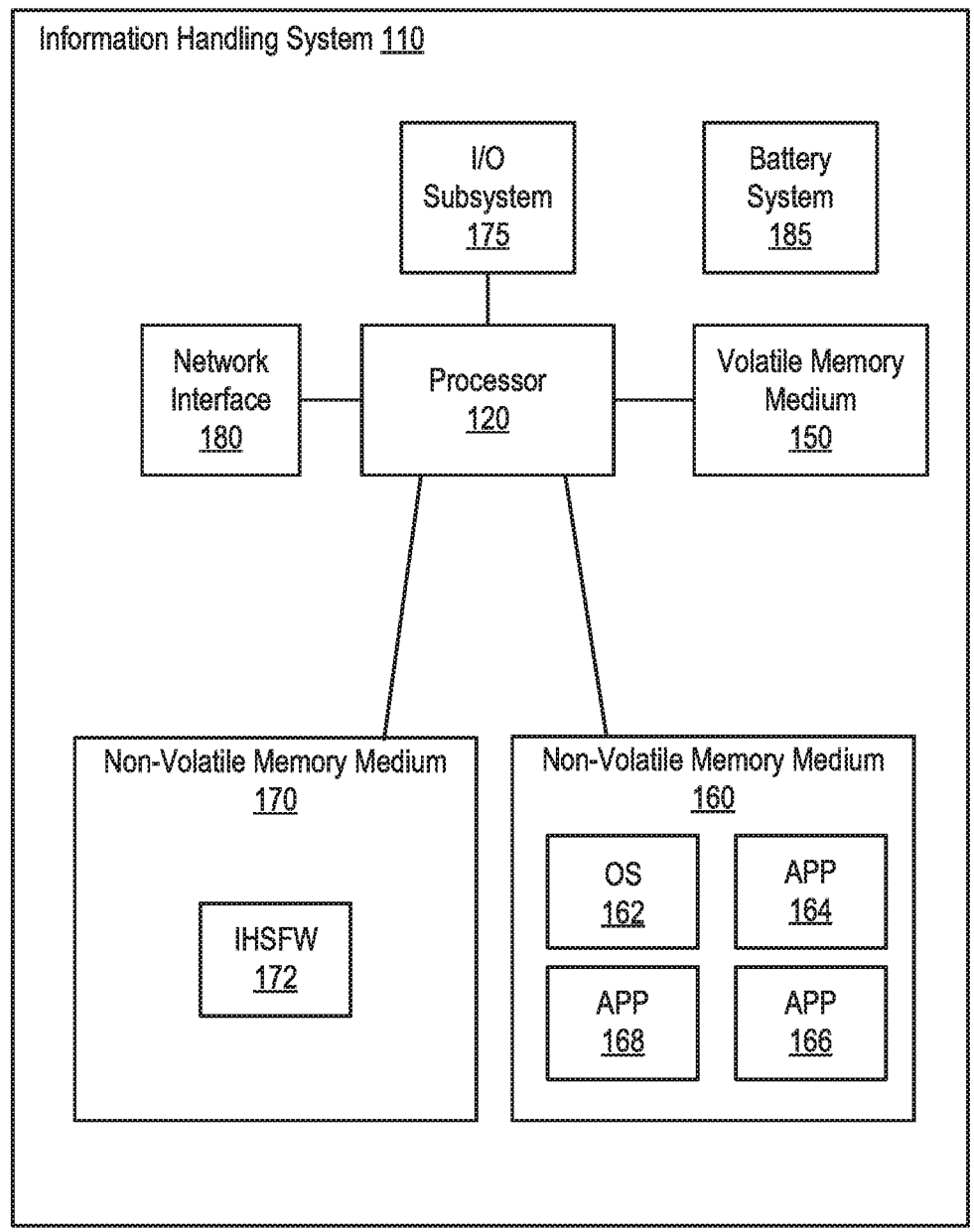
FIGS. 1A and 1B illustrate examples of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may utilize an energy storage device. For example, an information handling system may utilize an energy storage device to provide power to one or more components of the information handling system. In one or more embodiments, an information handling system may include an energy storage device. In one or more embodiments, an energy storage device may include one or more batteries. For example, a battery may include one or more cells. In one or more embodiments, a battery may be or include a device that includes one or more electrochemical cells with external connectors that may be utilized to provide to power one or more electrical devices. For example, the one or more electrical devices may include one or more of a flashlight, an information handling system, a wireless telephone, a smartphone, and an electric car, among others.

In one or more embodiments, when a battery is coupled to an external electric load, a redox reaction may convert high-energy reactants to lower-energy products. For example, a free-energy difference may be delivered to the external circuit as electrical energy. In one or more embodiments, a battery may be or include a lithium-ion battery or Li-ion battery. For example, a lithium-ion battery may be a type of rechargeable battery in which lithium ions move from a negative electrode of the battery to a positive electrode of the battery during discharge and back when charging. In one or more embodiments, a lithium-ion battery may utilize an intercalated lithium compound as an electrode material.

In one or more embodiments, energy densities of batteries continue to grow while components of the batteries are becoming thinner and/or smaller. For example, as components of the batteries become thinner and/or smaller, one or more possibilities of an internal short circuit may exist if one or more metal particles are unintentionally and/or mistakenly introduced to one or more portions of the battery and/or to one or more portions of a battery cell. In one or more embodiments, a critical problem may arise when an internal short circuit is established at interface between an anode and a cathode with a battery cell. For example, an exothermic reaction (also referred to as thermal runaway) may be triggered by an active material with high voltage potential. For instance, when thermal runaway of a battery cell occurs, there may be a voltage drop of the battery cell and/or a temperature rise of the battery cell.

In one or more embodiments, thermal runaway may pose one or more safety hazards. In one example, a safety hazard may include an injury to a human. In another example, a safety hazard may include damage to an electronic device. In one instance, the electronic device may be or include an information handling system. In another instance, the electronic device may be or include a component of an information handling system. In one or more embodiments, a method may be utilized to detect one or more abnormal conditions. For example, a method may be utilized to detect one or more abnormal conditions before an internal short circuit may become a safety hazard. For instance, the method may provide one or more preventative measures that may prevent an internal short circuit from, becoming a safety hazard and/or problematic. In one or more embodiments, if an internal short circuit is permitted to occur for a period of time transpiring, the internal short circuit may degrade a battery and/or result in a safety hazard.

In one or more embodiments, one or more attributes associated with a battery cell may be utilized. For example, the one or more attributes associated with the battery cell may include one or more of a voltage associated with the battery cell, an internal resistance of the battery cell, and a skin temperature of the battery cell, among others. In one or more embodiments, the one or more attributes associated with the battery cell may be compared with one or more stored values. For example, the one or more stored values may be stored via a data structure. For instance, the data structure may be or include a lookup table. In one or more embodiments, the one or more attributes associated with the battery cell may be compared with one or more determined values. For example, the one or more determined values may be determined via one or more formulas. In one or more embodiments, one or more comparisons may be determined periodically.

In one or more embodiments, if a measurement associated with a battery cell attribute is determined to be outside a threshold value, a battery management unit (BMU) may terminate a charging process. For example, determining if a measurement associated with a battery cell attribute is determined to be outside a threshold value may include determining if the measurement associated with the battery cell attribute is determined to be outside a safe operating area (SOA). For instance, a SOA may include a range of values. In one or more embodiments, a BMU may utilize a discharge device to reduce a state of charge (SOC). For example, the BMU may utilize the discharge device to reduce the SOC to an end of discharge (EOD). For instance, discharging a battery cell to the EOD may reduce and/or mitigate one or more risks of one or more safety hazards. In one or more embodiments, a temporary failure (TF) mode may be established to manage one or more exothermic events. In one or more embodiments, a permanent failure (PF) mode may be established to manage one or more exothermic events.

Figure 1B:
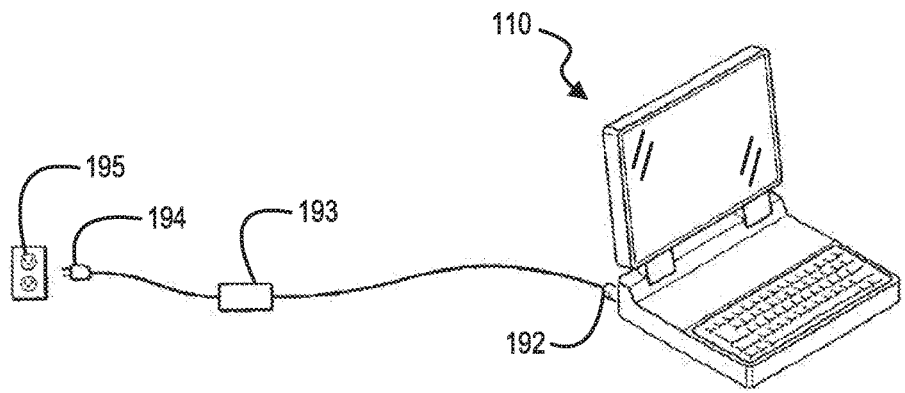

Turning now to FIGS. 1A and 1B, examples of an information handling system are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

As illustrated, IHS 110 may include a battery system 185. In one or more embodiments, battery system 185 may provide power to one or more components of IHS 110. For example, the one or more components of IHS 110 may include one or more of processor 120, volatile memory medium 150, non-volatile memory medium 160, non-volatile memory medium 170, I/O subsystem 175, and network interface 180, among others.

In one or more embodiments, IHS 110 may be coupled to a power supply 193 via a power coupling 192, as illustrated in FIG. 1B. As shown, power supply 193 may be coupled to a plug 194. In one or more embodiments, plug 194 may be coupled to an alternating current power supply receptacle 195. In one or more embodiments, power supply 193 may receive alternating current and may provide direct current to IHS 110. For example, power supply 193 may provide power to one or more components of IHS 110. For instance, power supply 193 may provide power to battery system 185. Although power supply 193 is illustrated as being external to IHS 110, IHS 110 may include power supply 193, according to one or more embodiments.

Figure 2A:
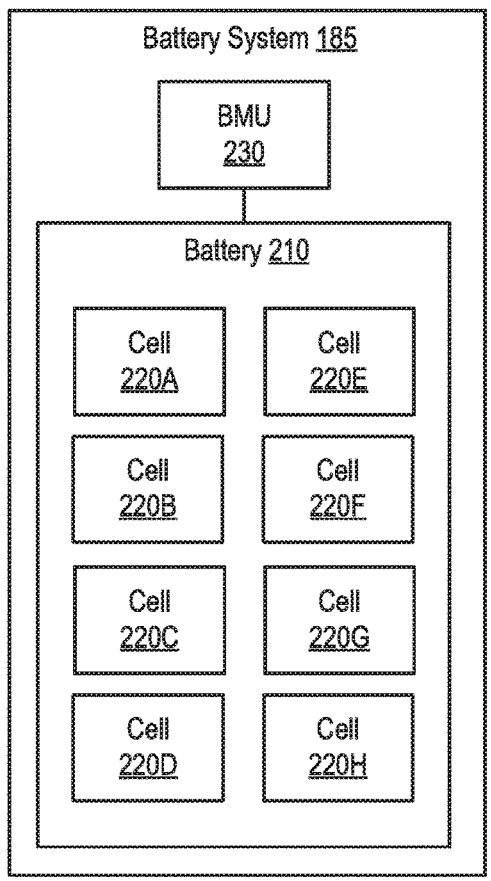
FIGS. 2A and 2B illustrate examples of a battery system, according to one or more embodiments.
Figure 2B:
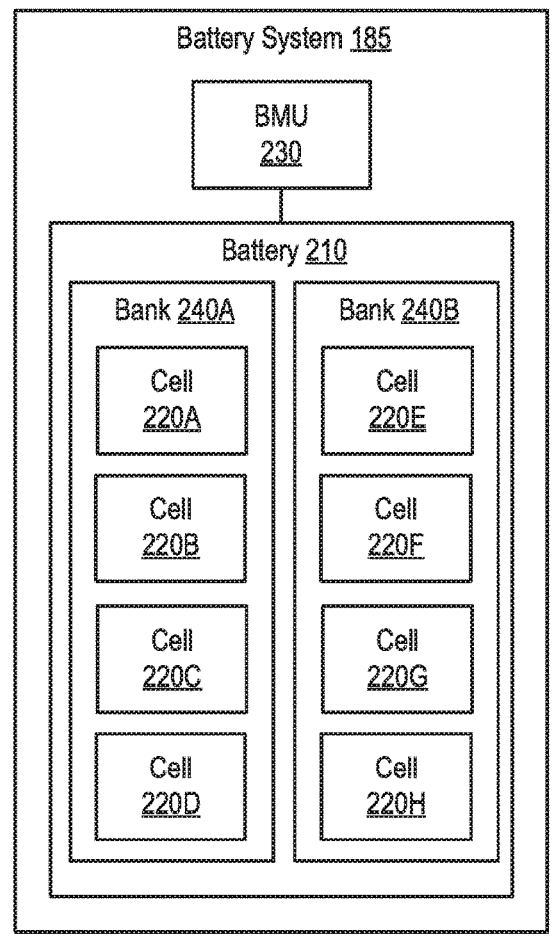

Turning now to FIGS. 2A and 2B, examples of a battery system are illustrated, according to one or more embodiments. As shown, battery system 185 may include a battery 210. In one or more embodiments, battery 210 may include multiple cells. As illustrated, battery 210 may include cells 220A-220H. As shown, battery system 185 may include a BMU 230. In one or more embodiments, BMU 230 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, or a Renesas microcontroller, among others. In one or more embodiments, BMU 230 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

In one or more embodiments, multiple cells 220 may be arranged via a bank. In one example, battery system 185 may include a bank 240A. For instance, bank 240A may include cells 220A-220D. In another example, battery system 185 may include a bank 240B. For instance, bank 240B may include cells 220E-220H. In one or more embodiments, two of more of cells 220A-220H may be arranged in a parallel fashion. In one or more embodiments, two of more of cells 220A-220H may be arranged in a serial fashion.

Figure 2C:
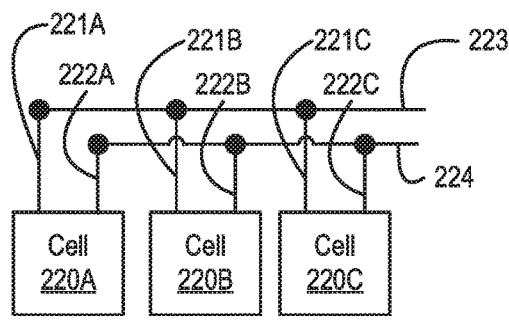
FIG. 2C illustrates an example of battery cells arranged in a parallel fashion, according to one or more embodiments.

Turning now to FIG. 2C, an example of battery cells arranged in a parallel fashion is illustrated, according to one or more embodiments. As shown, anodes 221A-221C of respective battery cells 220A-220C may be coupled to a conductor 223. As illustrated, cathodes 222A-222C of respective battery cells 220A-220C may be coupled to a conductor 224. Although not specifically illustrated, a switch may couple an anode 221 of a battery cell 220 to conductor 223, according to one or more embodiments. Although not specifically illustrated, a switch may couple a cathode 222 of a battery cell 220 to conductor 224, according to one or more embodiments.

Figure 2D:
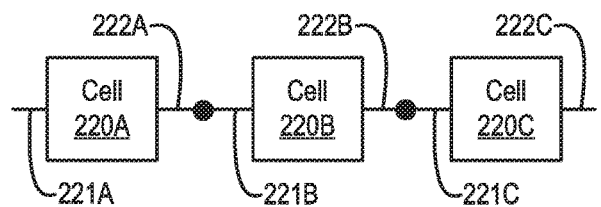
FIG. 2D illustrates an example of battery cells arranged in a series fashion, according to one or more embodiments.

Turning now to FIG. 2D, an example of battery cells arranged in a series fashion is illustrated, according to one or more embodiments. As shown, cathode 222A of battery cell 220A may be coupled to anode 221B of battery cell 220B. As illustrated, cathode 222B of battery cell 220B may be coupled to anode 221C of battery cell 220C.

Figure 2E:
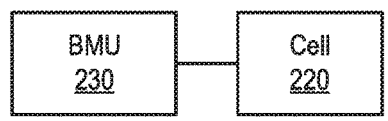
FIG. 2E illustrates an example of a battery management unit and a battery cell, according to one or more embodiments.

Turning now to FIG. 2E, an example of a battery management unit and a battery cell is illustrated, according to one or more embodiments. As shown, BMU 230 may be coupled to cell 220. In one or more embodiments, BMU 230 may determine one or more attributes of cell 220. In one example, BMU 230 may determine may determine a voltage value associated with cell 220. In another example, BMU 230 may determine may determine an internal resistance value associated with cell 220.

Figure 2F:
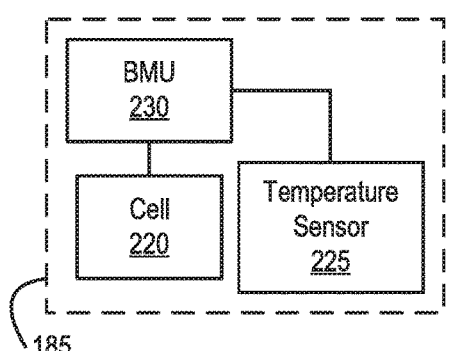
FIGS. 2F and 2G illustrate examples of a battery management unit, a battery cell, and a temperature sensor, according to one or more embodiments.
Figure 2G:
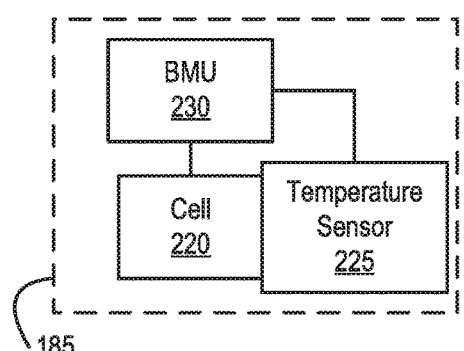

Turning now to FIGS. 2F and 2G, examples of a battery management unit, a battery cell, and a temperature sensor are illustrated, according to one or more embodiments. As shown, BMU 230 may be coupled to a temperature sensor 225. In one or more embodiments, temperature sensor 225 may be or include a temperature measurement device. In one or more embodiments, a temperature measurement device may transform a physical temperature into digital data. In one or more embodiments, a temperature measurement device may transform a physical temperature into an analog voltage and/or an analog current. In one or more embodiments, an analog to digital converter may be utilized to transform the analog voltage and/or the analog current into digital data. In one or more embodiments, a temperature measurement device may include one or more of a resistance temperature detector, a thermocouple, and a thermistor, among others.

In one or more embodiments, BMU 230 may determine a temperature associated with cell 220. For example, the temperature associated with cell 220 may be a temperature associated with an exterior surface of cell 220. For instance, the temperature associated with the exterior surface of cell 220 may be a skin temperature of cell 220. In one or more embodiments, temperature sensor 225 may be proximate to cell 220. For example, temperature sensor 225 may be near cell 220 but not in contact with cell 220, as illustrated in FIG. 2D. In one or more embodiments, temperature sensor 225 may be in contact with cell 220. For example, at least a portion of temperature sensor 225 may be in contact with at least a portion of an exterior of cell 220, as illustrated in FIG. 2E. For instance, at least a portion of temperature sensor 225 may be in contact with at least a portion of a skin of cell 220. In one or more embodiments, battery system 185 may include temperature sensor 225. In one or more embodiments, battery system 185 may include multiple temperature sensors 225. For example, battery system 185 may include a temperature sensors 225 for each cell 220 that battery system 185 may include.

Figure 2H:
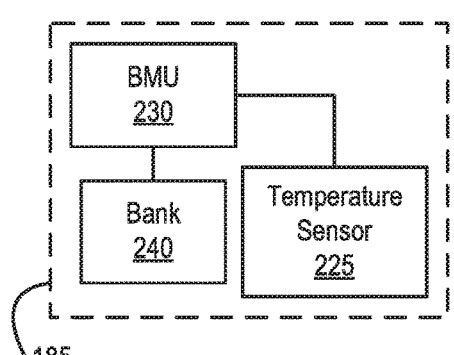
FIGS. 2H and 2I illustrate examples of a battery management unit, a battery cell, and a temperature sensor, according to one or more embodiments.
Figure 2I:
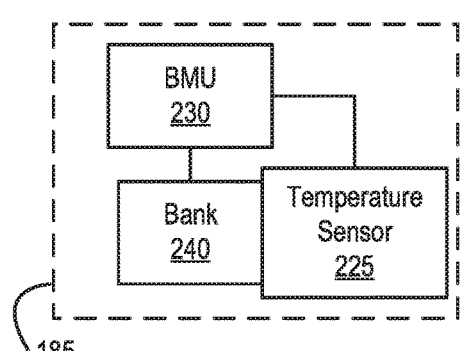

Turning now to FIGS. 2H and 2I, examples of a battery management unit, a battery cell, and a temperature sensor are illustrated, according to one or more embodiments. As shown, BMU 230 may be coupled to a bank 240. As illustrated, BMU 230 may be coupled to a temperature sensor 225. In one or more embodiments, temperature sensor 225 may be or include a temperature measurement device. In one or more embodiments, a temperature measurement device may transform a physical temperature into digital data. In one or more embodiments, a temperature measurement device may transform a physical temperature into an analog voltage and/or an analog current. In one or more embodiments, an analog to digital converter may be utilized to transform the analog voltage and/or the analog current into digital data. In one or more embodiments, a temperature measurement device may include one or more of a resistance temperature detector, a thermocouple, and a thermistor, among others.

In one or more embodiments, BMU 230 may determine a temperature associated with bank 240. For example, the temperature associated with bank 240 may be a temperature associated with an exterior surface of bank 240. For instance, the temperature associated with the exterior surface of bank 240 may be a skin temperature of bank 240. In one or more embodiments, temperature sensor 225 may be proximate to bank 240. For example, temperature sensor 225 may be near bank 240 but not in contact with bank 240, as illustrated in FIG. 2H. In one or more embodiments, temperature sensor 225 may be in contact with bank 240. For example, at least a portion of temperature sensor 225 may be in contact with at least a portion of an exterior of bank 240, as illustrated in FIG. 2I. For instance, at least a portion of temperature sensor 225 may be in contact with at least a portion of a skin of bank 240. In one or more embodiments, battery system 185 may include temperature sensor 225. In one or more embodiments, battery system 185 may include multiple temperature sensors 225. For example, battery system 185 may include a temperature sensors 225 for each bank 240 that battery system 185 may include.

Figure 2J:
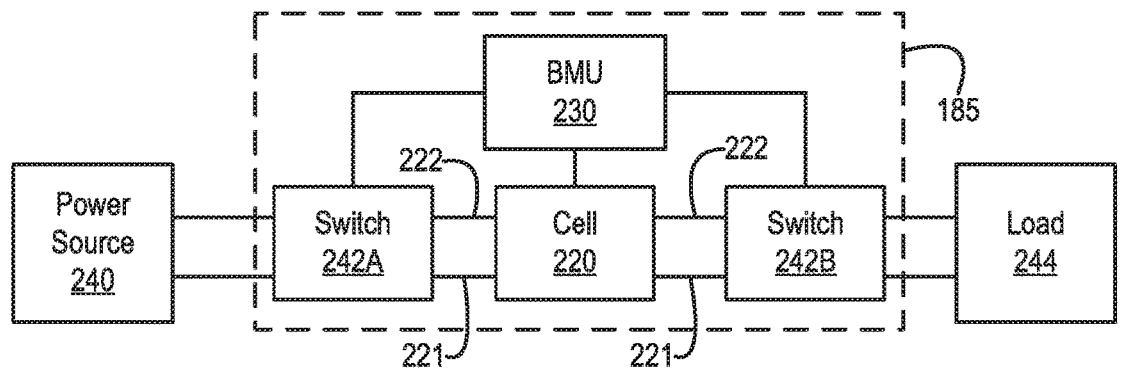
FIG. 2J illustrates an example of a battery management unit, a battery cell, and switches, according to one or more embodiments.

Turning now to FIG. 2J, an example of a battery management unit, a battery cell, and switches is illustrated, according to one or more embodiments. As shown, BMU 230 may be coupled to cell 220. As illustrated, BMU 230 may be coupled to switches 242A and 242B. As shown, cell 220 may be coupled to switches 242A and 242B. As illustrated, switch 242A may be coupled to a power source 240. In one or more embodiments, power source 240 may include power supply 193. In one or more embodiments, power source 240 may derive its power from power supply 193. As shown, switch 242B may be coupled to a load 244. In one or more embodiments, load 244 may include one or more components of IHS 110.

In one or more embodiments, battery system 185 may include multiple switches 242A. For example, battery system 185 may include a switch 242A for each cell 225 that battery system 185 may include. In one or more embodiments, battery system 185 may include multiple switches 242B. For example, battery system 185 may include a switch 242B for each cell 225 that battery system 185 may include.

In one or more embodiments, a switch 242 may include one or more electrical switches. In one example, an electrical switch may be or include a transistor. For instance, a transistor may include a bipolar junction transistor (BJT), a junction gate field-effect transistor (JFET), or a metal-oxide-semiconductor field-effect transistor (MOSFET), among others. In a second example, an electrical switch may be or include a logic gate. In another example, an electrical switch may include a mechanical switch. In one instance, the mechanical switch may be normally open. In another instance, the mechanical switch may be normally closed.

In one or more embodiments, BMU 230 may control a switch 242. In one example, BMU 230 may control switch 242A. In one instance, BMU 230 may control switch 242A to permit power from power source 240 to be provided to cell 220. In another instance, BMU 230 may control switch 242A to prevent power from power source 240 to be provided to cell 220. In another example, BMU 230 may control switch 242B. In one instance, BMU 230 may control switch 242B to permit power from cell 220 to be provided to load 244. In another instance, BMU 230 may control switch 242B to prevent power from power cell 220 to be provided to load 244.

Figure 3:
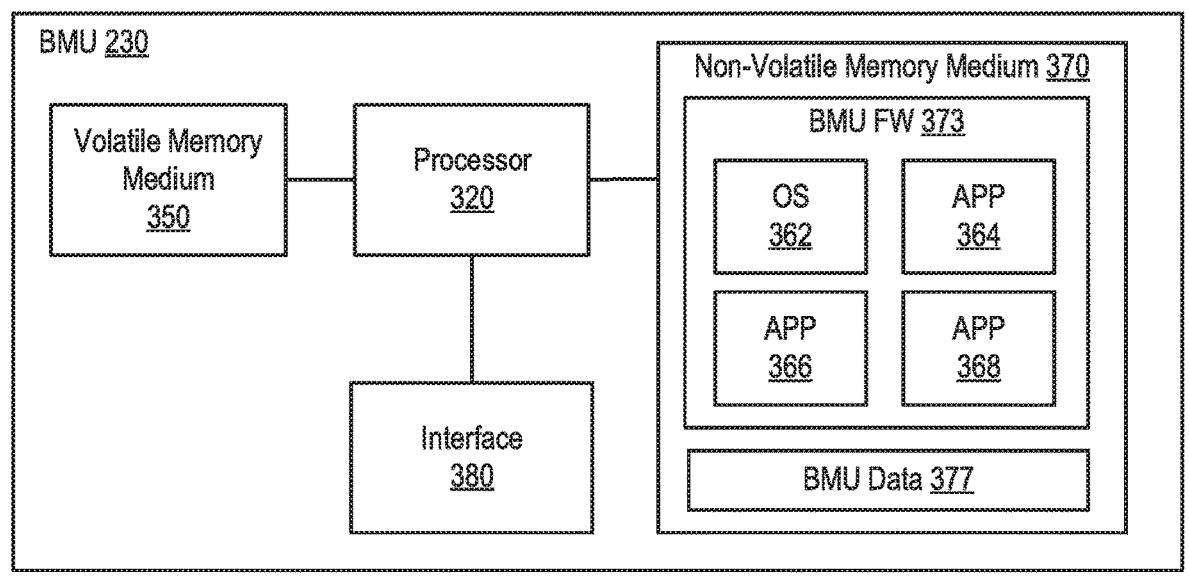
FIG. 3 illustrates an example of a battery management unit, according to one or more embodiments.

Turning now to FIG. 3, an example of a battery management unit is illustrated, according to one or more embodiments. As shown, BMU 230 may include a processor 320, a volatile memory medium 350, a non-volatile memory medium 370, and an interface 380. As illustrated, non-volatile memory medium 370 may include a BMU firmware (FW) 373, which may include an OS 362 and APPs 364-368, and may include BMU data 377. In one example, OS 362 may be or include a real-time operating system (RTOS). In a second example, OS 362 may be or include an Unix-like operating system. In another example, OS 362 may be or include a portable operating system interface (POSIX) compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable BMU 230 to provide and/or receive signals associated with other circuitry (e.g., diagnostic circuitry, control circuitry, one or more switches 242, etc.). In a third example, interface 380 may include circuitry that enables communicatively coupling to one or more networks. In a fourth example, interface 380 may include a network interface. In fifth example, interface 380 may include one or more analog to digital converters (ADCs). For instance, an analog to digital converter (ADC) may transform an analog signal to digital data that may be stored via one or more of memory media 350 and 370 and/or may be utilized by processor 320. In another example, interface 380 may include one or more digital to analog converters (DACs). For instance, a digital to analog converter (DAC) may transform digital data to an analog signal. In one or more embodiments, the digital data may be provided from one or more of memory media 350 and 370.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more of systems, flowcharts, methods, and/or processes described herein. For example, non-volatile memory medium 370 and/or volatile memory medium 360 may store instructions that may be executable in accordance with at least a portion of one or more of systems, flowcharts, methods, and/or processes described herein. In one or more embodiments, processor 320 may utilize BMU data 377. In one example, processor 320 may utilize BMU data 377 via non-volatile memory medium 370. In another example, one or more portions of BMU data 377 may be transferred to volatile memory medium 350, and processor 320 may utilize BMU data 377 via volatile memory medium 350.

Figure 4A:
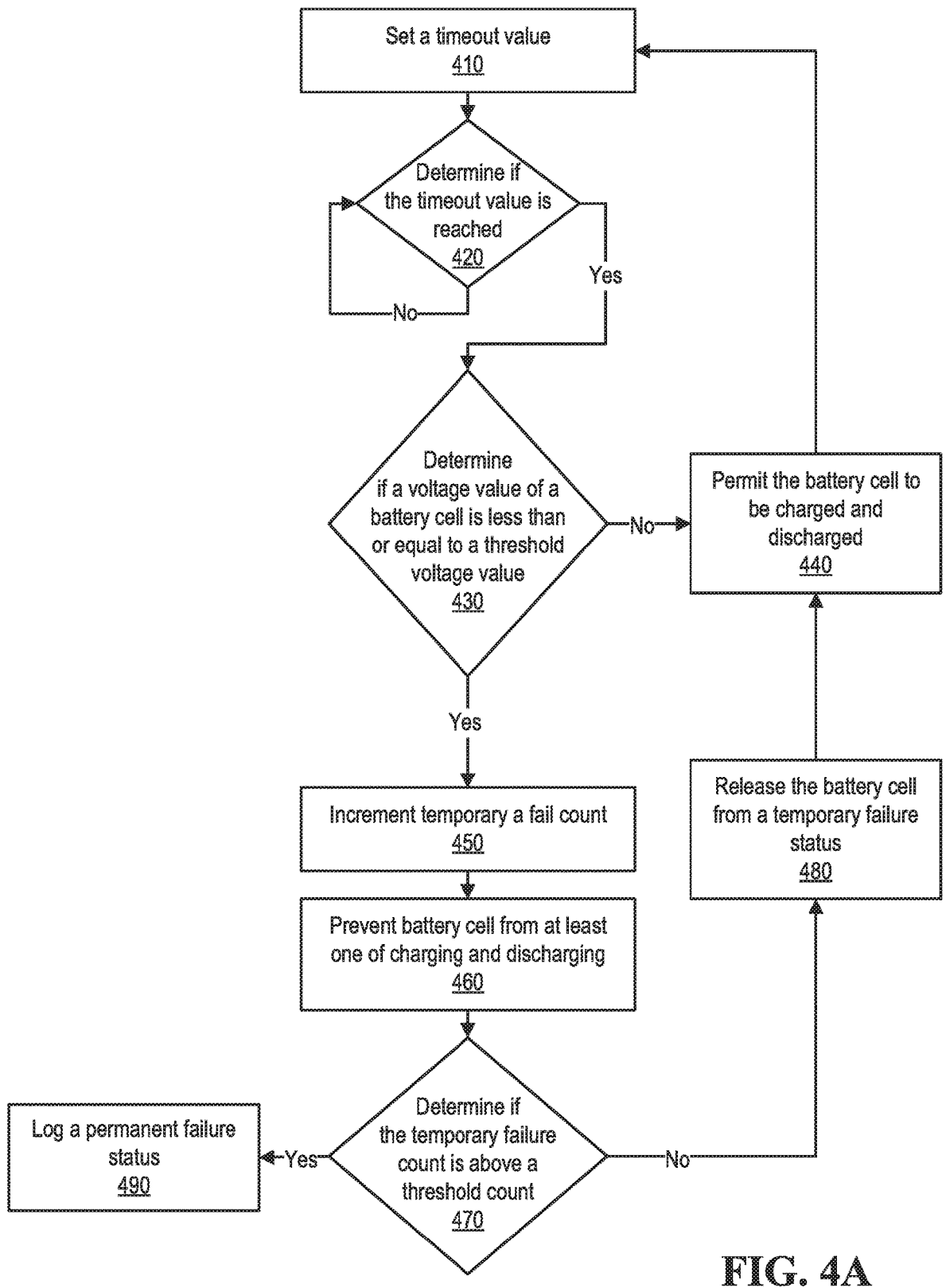
FIG. 4A illustrates an example of a method, according to one or more embodiments.

Turning now to FIG. 4A, an example of a method is illustrated, according to one or more embodiments. At 410, a timeout value may be set. In one example, the timeout value may be multiple milliseconds. For instance, the timeout value may be 250 milliseconds. In a second example, the timeout value may be one second. In another example, the timeout value may be multiple seconds. For instance, the timeout value may be five seconds. In one or more embodiments, the timeout value may be set to any amount of time. In one or more embodiments, setting a timeout value may include setting a timeout value of a timer. In one or more embodiments, BMU 230 may set the timeout value. In one or more embodiments, BMU 230 may include the timer.

At 420, it may be determined if the timeout value is reached. For example, BMU 230 may determine if the timeout value is reached. In one or more embodiments, determining if the timeout value is reached may include determining if an amount of time has transpired that meets or exceeds the timeout value. In one or more embodiments, determining if the timeout value is reached may include determining if a timer has expired. In one or more embodiments, determining if a timer has expired may include determining an amount of time has transpired that meets or exceeds the timeout value.

If the timeout value is not reached, the method may proceed to 420, according to one or more embodiments. If the timeout value is reached, it may be determined if a voltage value of a battery cell is less than or equal to a threshold voltage value, at 430. For example, BMU 230 may determine if a voltage value of cell 220 is less than or equal to a threshold voltage value. In one or more embodiments, determining if a voltage value of a battery cell is less than or equal to a threshold voltage value may include determining if a voltage value of a battery cell is less than or equal to a threshold voltage value when the battery cell is not discharging. For example, if the battery cell is discharging, a voltage value of a battery cell may normally drop. For instance, if the battery cell is discharging, a voltage value of a battery cell may normally drop to a voltage value that is less than a voltage value of the battery cell when the battery cell is not discharging.

If it is determined that the voltage value of the battery cell is not less than or equal to the threshold voltage value, battery cell charging and discharging may be permitted, at 440. For example, BMU 230 may permit charging and discharging of cell 220. For instance, BMU 230 may control switches 242A and 242B to permit charging and discharging of cell 220. In one or more embodiments, the method may proceed to 410.

If it is determined that the voltage value of the battery cell is less than or equal to the threshold voltage value, a temporary fail count may be incremented, at 450. For example, BMU 230 may increment a temporary fail count. For instance, the temporary fail count may be associated with cell 220. In one or more embodiments, the temporary fail count may be stored via one or more of memory media 350 and 370, among others. In one or more embodiments, incrementing the temporary fail count may include incrementing the temporary fail count by a value of one.

At 460, the battery cell may be prevented from at least one of charging and discharging. For example, BMU 230 may prevent cell 220 from at least one of charging and discharging. In one instance, BMU 230 may control switch 242A to prevent charging of cell 220. In another instance, BMU 230 may control switch 242B to prevent discharging of cell 220. In one or more embodiments, controlling a switch 242 may include providing a control signal to switch 242. In one example, BMU 230 may provide a first control signal to switch 242 to control switch 242 to conduct electricity. In a second example, BMU 230 may provide a second control signal to switch 242 to control switch 242 to prevent switch 242 from conducting electricity. In another example, BMU 230 may remove a control signal to switch 242 to control switch 242 to prevent switch 242 from conducting electricity.

At 470, it may be determined if the temporary fail count is above a threshold count. For example, BMU 230 may determine if the temporary fail count is above a threshold count. In one or more embodiments, determining if the temporary fail count is above the threshold count may include comparing the temporary fail count with the threshold count.

If the temporary fail count is not above the threshold count, the battery cell may be released from a temporary failure status, at 480. For example, BMU 230 may release cell 220 from a temporary failure status. In one or more embodiments, the method may proceed to 440. If the temporary fail count is above the threshold count, a permanent failure status may be logged, at 490. For example, BMU 230 may a log permanent failure status associated with cell 220. For instance, BMU 230 may a log permanent failure status associated with cell 220 via one or more of memory media 350 and 370, among others. In one or more embodiments, if a cell 220 is associated with a permanent failure status when BMU 220 is reset, battery system 185 may not utilize cell 220 when cell 220 is associated with a permanent failure status.

Figure 4B:
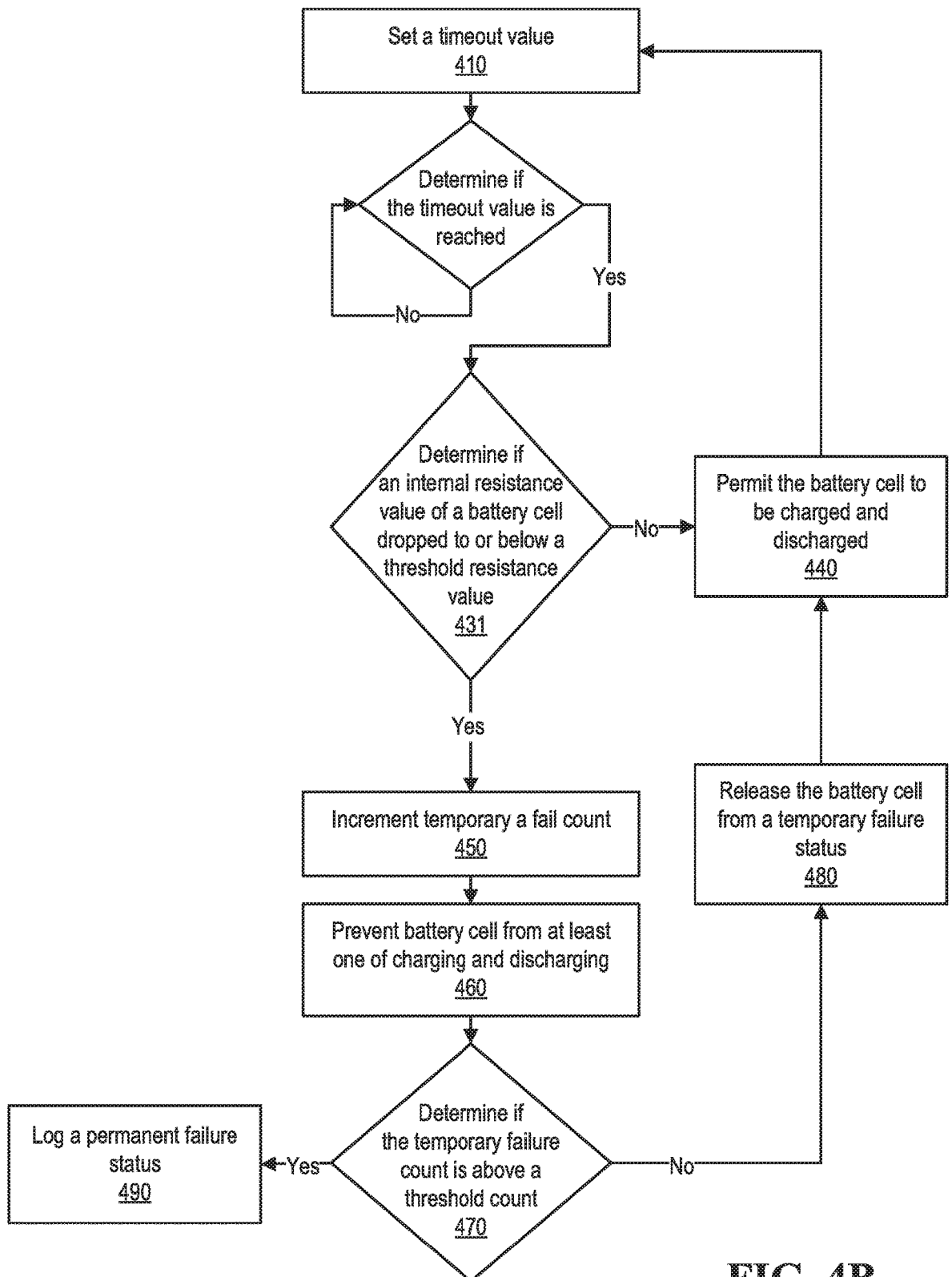
FIG. 4B illustrates a second example of a method, according to one or more embodiments.

Turning now to FIG. 4B, a second example of a method is illustrated, according to one or more embodiments. In one or more embodiments, method elements 410, 420, and 450-490 of FIG. 4B may be performed in accordance with method elements 410, 420, and 450-490 described with reference to FIG. 4A.

If the timeout value is reached, it may be determined if an internal resistance value of a battery cell has dropped to or below a threshold resistance value, at 431. For example, BMU 230 may determine if an internal resistance value of a battery cell 220 has dropped to or below a threshold resistance value. If it is determined that the internal resistance value of the battery cell has not dropped to or below the threshold resistance value, the method may proceed to 440, according to one or more embodiments. If it is determined that the internal resistance value of the battery cell has dropped to or below the threshold resistance value, the method may proceed to 450, according to one or more embodiments.

Figure 4C:
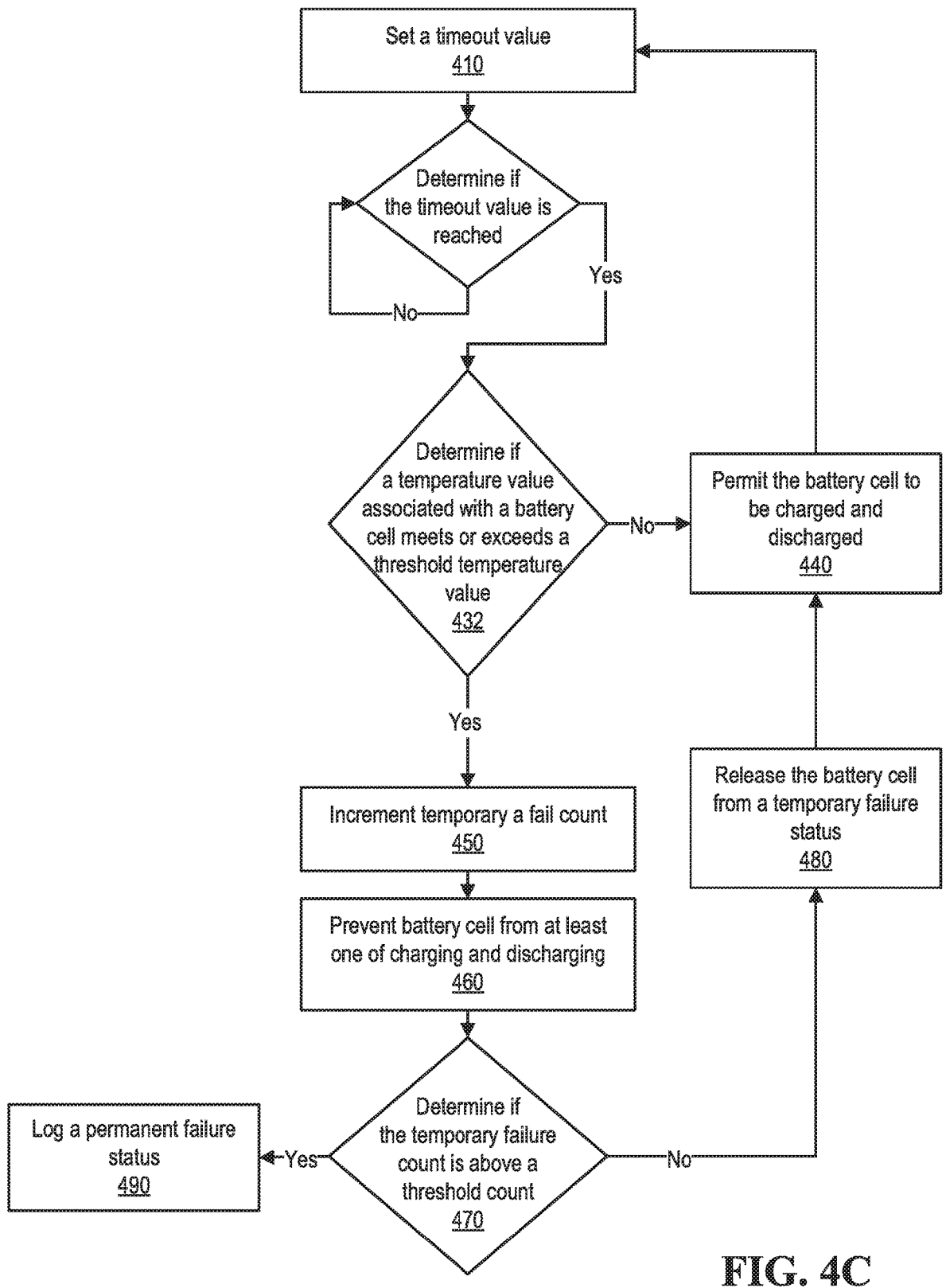
FIG. 4C illustrates a third of a method, according to one or more embodiments.

Turning now to FIG. 4C, a third example of a method is illustrated, according to one or more embodiments. In one or more embodiments, method elements 410, 420, and 450-490 of FIG. 4C may be performed in accordance with method elements 410, 420, and 450-490 described with reference to FIG. 4A. If the timeout value is reached, it may be determined if a temperature value associated with a battery cell meets or exceeds a threshold temperature value, at 432. For example, BMU 230 may determine if a temperature value associated with cell 220 meets or exceeds a threshold temperature value.

In one or more embodiments, determining if a temperature value associated with a battery cell meets or exceeds a threshold temperature value may include determining the temperature value associated with the battery cell. In one example, BMU 230 may determine the temperature value associated with cell 220. For instance, BMU 230 may determine the temperature value associated with cell 220 via temperature sensor 225. In another example, temperature sensor 225 may determine the temperature value associated with cell 220. In one instance, temperature sensor 225 may provide the temperature value associated with cell 220 to BMU 230. In another instance, BMU 230 may receive provide the temperature value associated with cell 220 from temperature sensor 225.

If it is determined that the temperature value associated with the battery cell does not meet or exceed the threshold temperature value, the method may proceed to 440, according to one or more embodiments. If it is determined the temperature value associated with the battery cell meets or exceeds the threshold temperature value, the method may proceed to 450, according to one or more embodiments.

In one or more embodiments, the threshold temperature value may be based at least on a discharge current value. In one example, the threshold temperature value may be a first threshold temperature value that is associated with a first discharge current value. In another example, the threshold temperature value may be a second threshold temperature value that is associated with a second discharge current value. For instance the second threshold temperature value may be greater than the first threshold temperature value and the second discharge current value may be greater than first discharge current value.

In one or more embodiments, multiple threshold temperature values may be stored via a data structure. For example, BMU 230 may access the data structure to determine the threshold temperature value based at least on a discharge current value. In one instance, BMU 230 may store the data structure (e.g., via one or more of memory media 350 and 370). In another instance, the data structure may be or include a lookup table. In one or more embodiments, accessing the data structure to determine the threshold temperature value based at least on the discharge current value may include retrieving the threshold temperature value from the data structure based at least on the discharge current value.

In one or more embodiments, BMU 230 may determine one or more discharge current values.

In one or more embodiments, the threshold temperature value may be based at least on a timeout value. In one example, the threshold temperature value may be a first temperature value that is associated with a first timeout value. In another example, the threshold temperature value may be a second threshold temperature value that is associated with a second timeout value. For instance the second threshold temperature value may be greater than the first threshold temperature value and the second timeout value may be greater than first timeout value.

In one or more embodiments, multiple threshold temperature values may be stored via a data structure. For example, BMU 230 may access the data structure to determine the threshold temperature value based at least on a timeout value. In one instance, BMU 230 may store the data structure (e.g., via one or more of memory media 350 and 370). In another instance, the data structure may be or include a lookup table. In one or more embodiments, accessing the data structure to determine the threshold temperature value based at least on the timeout value may include retrieving the threshold temperature value from the data structure based at least on the timeout value.

Figure 4D:
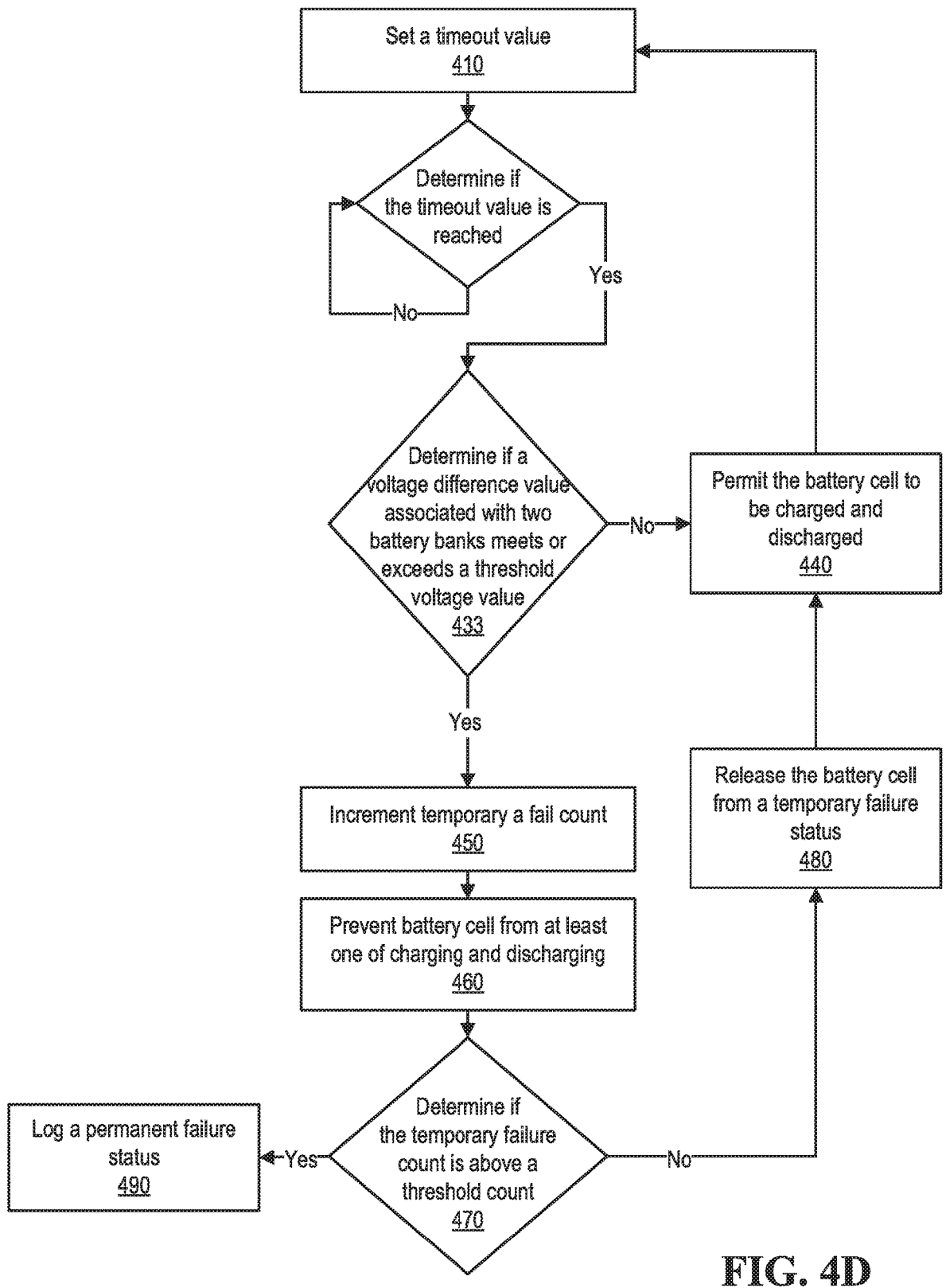
FIG. 4D illustrates a fourth of a method, according to one or more embodiments.

Turning now to FIG. 4D, a fourth example of a method is illustrated, according to one or more embodiments. In one or more embodiments, method elements 410, 420, and 450-490 of FIG. 4D may be performed in accordance with method elements 410, 420, and 450-490 described with reference to FIG. 4A.

If the timeout value is reached, it may be determined if a voltage difference value associated with two battery banks meets or exceeds a threshold voltage value, at 433. For example, BMU 230 may determine if a voltage difference value associated with battery banks 240A and 240B meets or exceeds a threshold voltage value. In one or more embodiments, determining if a voltage difference value associated with battery banks 240A and 240B meets or exceeds a threshold voltage value may include determining a voltage value of battery bank 240A and determining a voltage value of battery bank 240B. For example, a voltage difference value associated with battery banks 240A and 240B may include a difference of a voltage value of battery bank 240A and a voltage value of battery bank 240B. If the voltage difference value associated with the two battery banks does not meet or exceed the threshold voltage value, the method may proceed to 440, according to one or more embodiments. If the voltage difference value associated with the two battery banks meets or exceeds the threshold voltage value, the method may proceed to 450, according to one or more embodiments.

Figure 4E:
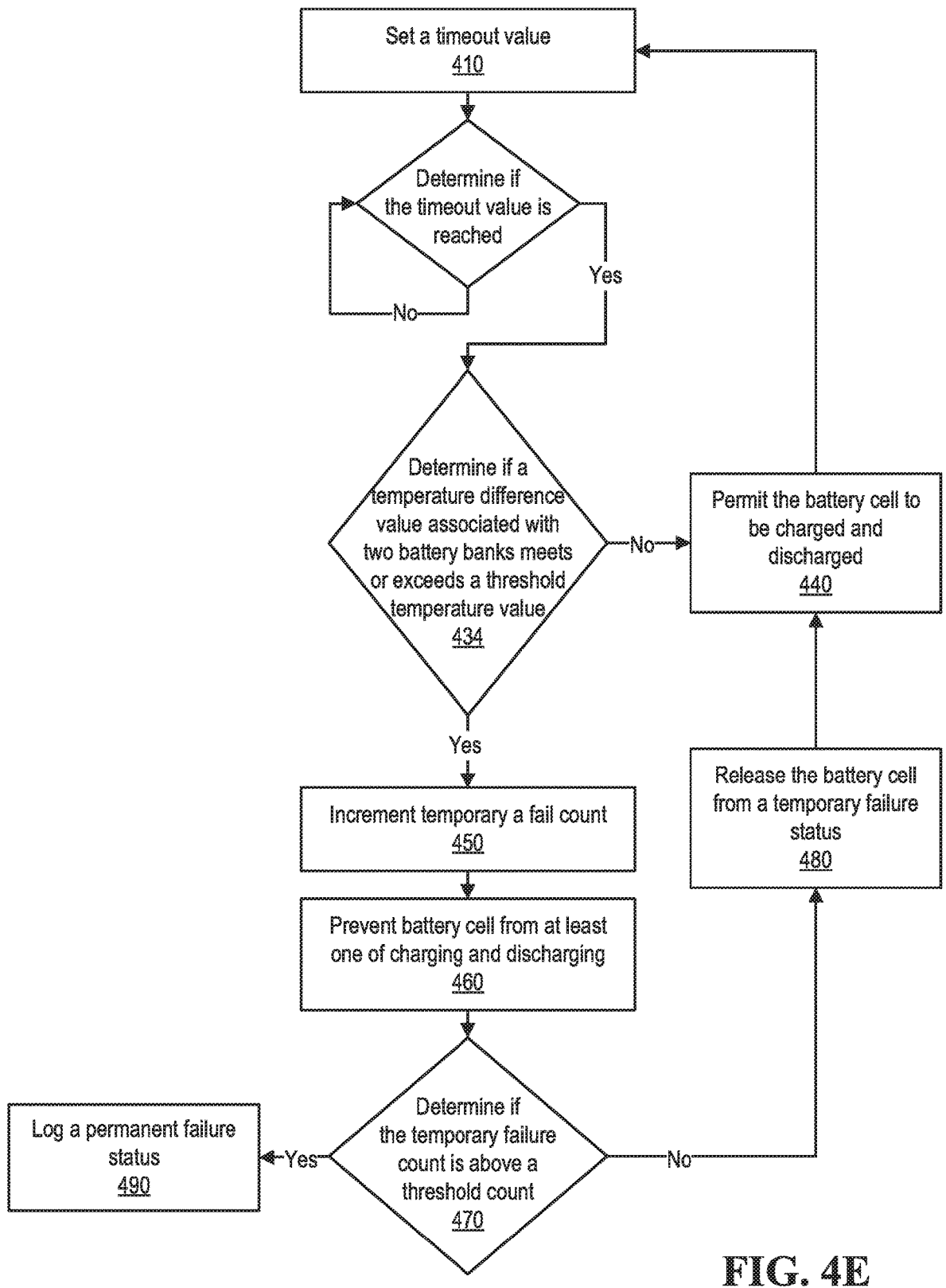
FIG. 4E illustrates a fifth of a method, according to one or more embodiments.

Turning now to FIG. 4E, a fifth example of a method is illustrated, according to one or more embodiments. In one or more embodiments, method elements 410, 420, and 450-490 of FIG. 4E may be performed in accordance with method elements 410, 420, and 450-490 described with reference to FIG. 4A.

If the timeout value is reached, it may be determined if a temperature difference value associated with two battery banks meets or exceeds a threshold temperature value, at 434. For example, BMU 230 may determine if a temperature difference value associated with battery banks 240A and 240B meets or exceeds a threshold temperature value. In one or more embodiments, determining if a temperature difference value associated with battery banks 240A and 240B meets or exceeds a threshold temperature value may include determining a temperature value of battery bank 240A and determining a temperature value of battery bank 240B. For example, a temperature difference value associated with battery banks 240A and 240B may include a difference of a temperature value of battery bank 240A and a temperature value of battery bank 240B.

If the temperature difference value associated with the two battery banks does not meet or exceed the threshold temperature value, the method may proceed to 440, according to one or more embodiments. If the temperature difference value associated with the two battery banks meets or exceeds the threshold temperature value, the method may proceed to 450, according to one or more embodiments.

Figure 4F:
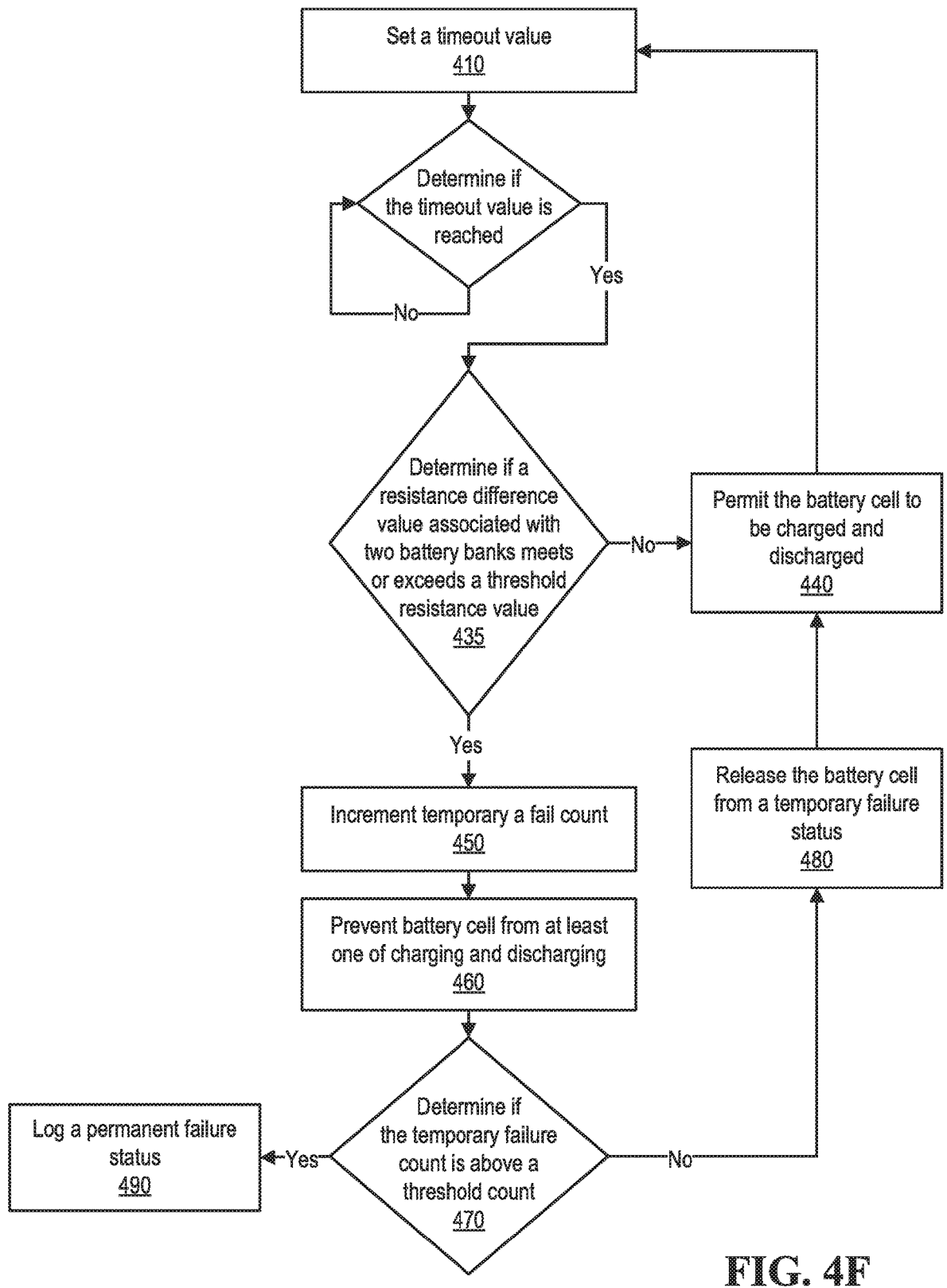
FIG. 4F illustrates a sixth of a method, according to one or more embodiments.

Turning now to FIG. 4F, a sixth example of a method is illustrated, according to one or more embodiments. In one or more embodiments, method elements 410, 420, and 450-490 of FIG. 4F may be performed in accordance with method elements 410, 420, and 450-490 described with reference to FIG. 4A.

If the timeout value is reached, it may be determined if a resistance difference value associated with two battery banks meets or exceeds a threshold resistance value, at 435. For example, BMU 230 may determine if a resistance difference value associated with battery banks 240A and 240B meets or exceeds a threshold resistance value. In one or more embodiments, determining if a resistance difference value associated with battery banks 240A and 240B meets or exceeds a threshold resistance value may include determining a resistance value of battery bank 240A and determining a resistance value of battery bank 240B. For example, a resistance difference value associated with battery banks 240A and 240B may include a difference of a resistance value of battery bank 240A and a resistance value of battery bank 240B.

If the resistance difference value associated with the two battery banks does not meet or exceed the threshold resistance value, the method may proceed to 440, according to one or more embodiments. If the resistance difference value associated with the two battery banks meets or exceeds the threshold resistance value, the method may proceed to 450, according to one or more embodiments.

In one or more embodiments, each of the methods described with reference to FIGS. 4A-4F may utilize a separate temporary failure count. In one example, the method described with reference to FIG. 4A may utilize a first temporary failure count. In a second example, the method described with reference to FIG. 4B may utilize a second temporary failure count. For instance, the second temporary failure count may be different from the first temporary failure count. In another example, the method described with reference to FIG. 4C may utilize a third temporary failure count. For instance, the third temporary failure count may be different from the first temporary failure count and different from the second temporary failure count.

In one or more embodiments, the methods described with reference to FIGS. 4A-4F may utilize a temporary failure count that is shared among the methods described with reference to FIGS. 4A-4F. In one or more embodiments, a method described with reference to one of FIG. 4A-4C may be performed for each cell 220 of battery 210. In one or more embodiments, a method described with reference to one of FIG. 4D-4F may be performed for pair of banks 240 of battery 210. Although not specifically illustrated, battery system 185 and/or battery 210 may include multiple pairs of banks 240, for example. In one or more embodiments, a bank 240 may belong to multiple pairs of banks 240.

In one or more embodiments, multiple temporary failure counts may be utilized. In one example, each of cells 220A-220H may be associated with a separate temporary failure count. In one instance, a first temporary failure count may be associated with cell 220A. In another instance, a second temporary failure count, different from the first temporary fail count, may be associated with cell 220B. In another example, each of banks 240A and 240B may be associated with a separate temporary failure count. In one instance, a first temporary failure count may be associated with bank 240A. In another instance, a second temporary failure count, different from the first temporary fail count, may be associated with bank 240B.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores instructions executable by the at least one processor; and
   a battery system coupled to the at least one processor and the memory medium and configured to provide power to the at least one processor and the memory medium;
   wherein the battery system includes a plurality of battery cells and a battery management unit;
   wherein the battery management unit is configured to:
      determine that a first timeout value has been reached;
      in response to determining that the first timeout value has been reached, for each battery cell of the plurality of battery cells of the battery system:
         determine a temperature value associated with the battery cell;
         determine if the temperature value associated with the battery cell meets or exceeds a threshold temperature value;
         if the temperature value associated with the battery cell does not meet or exceed the threshold temperature value, permit the battery cell to be charged and discharged;
         if the temperature value associated with the battery cell meets or exceeds the threshold temperature value:
            increment a first temporary fail count associated with the battery cell; and
            prevent at least one of charging and discharging the battery cell;
         determine if the first temporary fail count is above a first temporary fail count threshold;
         if the first temporary fail count is not above the first temporary fail count threshold, permit charging and discharging the battery cell; and
         if the first temporary fail count is above the first temporary fail count threshold, log a permanent failure of the battery cell.

2. The information handling system of claim 1, wherein the battery management unit is further configured to:
   determine that a second timeout value has been reached;
   in response to the determining that the second timeout value has been reached, for each battery cell of the plurality of battery cells of the battery system:
      determine a voltage value associated with the battery cell when the battery cell is not discharging;
      determine if the voltage value is less than or equal to a threshold voltage value;
      if the voltage value is not less than or equal to the threshold voltage value, permit the battery cell to be charged and discharged;
      if the voltage value is less than or equal to the threshold voltage value:
         increment a second temporary fail count associated with the battery cell; and
         prevent the at least one of charging and discharging the battery cell;
      determine if the second temporary fail count is above a second temporary fail count threshold;
      if the second temporary fail count is not above the second temporary fail count threshold, permit charging and discharging the battery cell; and
      if the second temporary fail count is above the second temporary fail count threshold, log the permanent failure of the battery cell.

3. The information handling system of claim 2, wherein the second timeout value is the first timeout value.

4. The information handling system of claim 2,
   wherein the second temporary fail count is the first temporary fail count; and
   wherein the second temporary fail count threshold is the first temporary fail count threshold.

5. The information handling system of claim 1, wherein at least two of the plurality of battery cells are arranged in a parallel fashion.

6. The information handling system of claim 1,
   wherein the battery system further includes a switch coupled to the battery cell; and
   wherein, to prevent the at least one of charging and discharging the battery cell, the battery management unit is further configured to control the switch to prevent the at least one of charging and discharging the battery cell.

7. The information handling system of claim 1, wherein the battery management unit is further configured to:
   determine that a third timeout value has been reached;
   in response to determining that the third timeout value has been reached, for each battery cell of the plurality of battery cells of the battery system:

determine an internal resistance value associated with the battery cell;
determine if the internal resistance value is less than or equal to a threshold internal resistance value;
if the internal resistance value is not less than or equal to the threshold internal resistance value, permit the battery cell to be charged and discharged;
if the internal resistance value is less than or equal to the threshold internal resistance value:
increment a third temporary fail count associated with the battery cell; and
prevent the at least one of charging and discharging the battery cell;
determine if the third temporary fail count is above a third temporary fail count threshold;
if the third temporary fail count is not above the third temporary fail count threshold, permit charging and discharging the battery cell; and
if the third temporary fail count is above the third temporary fail count threshold, log the permanent failure of the battery cell.

8. A method, comprising:
determining that a first timeout value has been reached;
in response to the determining that the first timeout value has been reached, for each battery cell of a plurality of battery cells of a battery system:
  determining a temperature value associated with the battery cell;
  determining if the temperature value associated with the battery cell meets or exceeds a threshold temperature value;
  if the temperature value associated with the battery cell does not meet or exceed the threshold temperature value, permitting the battery cell to be charged and discharged;
  if the temperature value associated with the battery cell meets or exceeds the threshold temperature value:
    incrementing a first temporary fail count associated with the battery cell; and
    preventing at least one of charging and discharging the battery cell;
  determining if the first temporary fail count is above a first temporary fail count threshold;
  if the first temporary fail count is not above the first temporary fail count threshold, performing the permitting the battery cell to be charged and discharged; and
  if the first temporary fail count is above the first temporary fail count threshold, logging a permanent failure of the battery cell.

9. The method of claim 8, further comprising:
determining that a second timeout value has been reached;
in response to the determining that the second timeout value has been reached, for each battery cell of the plurality of battery cells of the battery system:
  determining a voltage value associated with the battery cell when the battery cell is not discharging;
  determining if the voltage value is less than or equal to a threshold voltage value;
  if the voltage value is not less than or equal to the threshold voltage value, performing the permitting the battery cell to be charged and discharged;
  if the voltage value is less than or equal to the threshold voltage value:
    incrementing a second temporary fail count associated with the battery cell; and
    performing the preventing the at least one of charging and discharging the battery cell;
  determining if the second temporary fail count is above a second temporary fail count threshold;
  if the second temporary fail count is not above the second temporary fail count threshold, performing the permitting the battery cell to be charged and discharged; and
  if the second temporary fail count is above the second temporary fail count threshold, performing the logging the permanent failure of the battery cell.

10. The method of claim 9, wherein the second timeout value is the first timeout value.

11. The method of claim 9,
wherein the second temporary fail count is the first temporary fail count; and
wherein the second temporary fail count threshold is the first temporary fail count threshold.

12. The method of claim 8, wherein at least two of the plurality of battery cells are arranged in a parallel fashion.

13. The method of claim 8, wherein the preventing the at least one of charging and discharging the battery cell includes controlling at least one switch coupled to the battery cell.

14. The method of claim 8, further comprising:
determining that a third timeout value has been reached;
in response to the determining that the third timeout value has been reached, for each battery cell of the plurality of battery cells of the battery system:
  determining an internal resistance value associated with the battery cell;
  determining if the internal resistance value is less than or equal to a threshold internal resistance value;
  if the internal resistance value is not less than or equal to the threshold internal resistance value, performing the permitting the battery cell to be charged and discharged;
  if the internal resistance value is less than or equal to the threshold internal resistance value:
    incrementing a third temporary fail count associated with the battery cell; and
    performing the preventing the at least one of charging and discharging the battery cell;
  determining if the third temporary fail count is above a third temporary fail count threshold;
  if the third temporary fail count is not above the third temporary fail count threshold, performing the permitting the battery cell to be charged and discharged; and
  if the third temporary fail count is above the third temporary fail count threshold, performing the logging the permanent failure of the battery cell.

15. A battery system, comprising:
a plurality of battery cells; and
a battery management unit coupled to the plurality of battery cells;
wherein the battery system is configured to provide power to one or more components of an information handling system; and
wherein the battery management unit includes:
  a processor;
  a memory medium, coupled to the processor, that stores instructions executable by the processor, which when executed by the processor, cause the battery system to:
    determine that a first timeout value has been reached;

in response to determining that the first timeout value has been reached, for each battery cell of the plurality of battery cells of the battery system:
    determine a temperature value associated with the battery cell;
    determine if the temperature value associated with the battery cell meets or exceeds a threshold temperature value;
    if the temperature value associated with the battery cell does not meet or exceed the threshold temperature value, permit the battery cell to be charged and discharged;
    if the temperature value associated with the battery cell meets or exceeds the threshold temperature value:
        increment a first temporary fail count associated with the battery cell; and
        prevent at least one of charging and discharging the battery cell;
    determine if the first temporary fail count is above a first temporary fail count threshold;
    if the first temporary fail count is not above the first temporary fail count threshold, permit charging and discharging the battery cell; and
    if the first temporary fail count is above the first temporary fail count threshold, log a permanent failure of the battery cell.

16. The battery management system of claim 15, wherein the instructions further cause the battery management system to:
    determine that a second timeout value has been reached;
    in response to the determining that the second timeout value has been reached, for each battery cell of the plurality of battery cells of the battery system:
        determine a voltage value associated with the battery cell when the battery cell is not discharging;
        determine if the voltage value is less than or equal to a threshold voltage value;
        if the voltage value is not less than or equal to the threshold voltage value, performing the permitting the battery cell to be charged and discharged;
        if the voltage value is less than or equal to the threshold voltage value:
            increment a second temporary fail count associated with the battery cell; and
            prevent the at least one of charging and discharging the battery cell;
        determine if the second temporary fail count is above a second temporary fail count threshold;
        if the second temporary fail count is not above the second temporary fail count threshold, permit charging and discharging the battery cell; and
        if the second temporary fail count is above the second temporary fail count threshold, log the permanent failure of the battery cell.

17. The battery management system of claim 16, wherein the second timeout value is the first timeout value.

18. The battery management system of claim 16,
    wherein the second temporary fail count is the first temporary fail count; and
    wherein the second temporary fail count threshold is the first temporary fail count threshold.

19. The battery management system of claim 15, wherein at least two of the plurality of battery cells are arranged in a parallel fashion.

20. The battery management system of claim 15, further comprising:
    a switch coupled to the battery cell;
    wherein, to prevent the at least one of charging and discharging the battery cell, the instructions further cause the battery management system to control the switch to prevent the at least one of charging and discharging the battery cell.

* * * * *